United States Patent [19]  [11] 4,236,934
Bell  [45] Dec. 2, 1980

[54] NONLEAFING ALUMINUM FLAKE PIGMENTS

[75] Inventor: Harry E. Bell, East Brunswick, N.J.

[73] Assignee: Alcan Aluminum Corporation, Cleveland, Ohio

[21] Appl. No.: 16,707

[22] Filed: Feb. 28, 1979

[51] Int. Cl.$^3$ .......................... B02C 15/00; C09C 1/62
[52] U.S. Cl. ................................ 106/290; 106/308 F; 106/291; 241/15; 241/16
[58] Field of Search ............ 427/216; 106/290, 308 F, 106/291; 428/403; 241/15, 16

[56] References Cited

U.S. PATENT DOCUMENTS

| | | | |
|---|---|---|---|
| 1,920,234 | 8/1933 | Arthur | 241/15 X |
| 3,234,038 | 2/1966 | Stephens et al. | 106/290 X |
| 3,709,439 | 1/1973 | Tundermann | 241/15 |
| 3,776,473 | 12/1973 | Casey et al. | 241/15 |
| 3,776,473 | 12/1973 | Casey et al. | 241/15 |
| 3,781,177 | 12/1973 | Kondis et al. | 149/6 |
| 4,065,060 | 12/1977 | Booz | 241/16 |
| 4,138,270 | 2/1979 | Ishijima et al. | 106/290 X |

OTHER PUBLICATIONS

Edwards, J. D. et al. Aluminum Paint and Powder 3rd Ed. (1955), Reinhold Pub. Corp., N.Y., pp. 22,25-26,-37-38.

Primary Examiner—Helen McCarthy
Attorney, Agent, or Firm—Cooper, Dunham, Clark, Griffin & Moran

[57] ABSTRACT

A process for making aluminum flake pigment by reducing aluminum to flake form in the presence of a milling agent, wherein the milling agent comprises isostearic acid, alone or together with a small amount of other, nonleafing milling agents. The product is a substantially nonleafing pigment constituted of aluminum flake particles having a surface layer of isostearic acid milling agent residue.

20 Claims, No Drawings

NONLEAFING ALUMINUM FLAKE PIGMENTS

BACKGROUND OF THE INVENTION

This invention relates to nonleafing aluminum flake pigments and processes for making same.

Both leafing and nonleafing aluminum flake pigments are constituted of minute flakes of aluminum or aluminum-based alloys, and are typically supplied as pastes or powders for use e.g. in paints, inks and other finishes to impart metallic luster and/or silvery color to surface coatings of such finishes.

The property of "leafing" may be defined as the tendency of metal pigment flakes, when dispersed in a finish vehicle having sufficiently high surface tension (and free of substances that inhibit leafing), to become arranged in flat, parallel or overlapping relation at the surface or immediately adjacent the surface of an applied coating layer of the finish, so as to provide a highly reflective coating that simulates the appearance of bare metal. Thus, leafing aluminum pigments are those in which the proportion of flakes that "leaf" is great enough to produce this visual effect, as is desired for a variety of applications.

Nonleafing pigments (with which the present invention is concerned), on the other hand, exhibit relatively little or no characteristics of the leafing pigments. The nonleafing flakes, when dispersed in an applied coating layer of a finish, are at least predominately disposed in random attitudes and at random distances from the coating surface, providing a less reflective bare metallic appearance than when a leafing pigment is used. Nonleafing pigments are particularly desirable and effectual in thin coat application (e.g. of the order of 0.5 mils) finishes which are subject to surface abrasion, weathering or the like wherein impairment or removal of surface adjacent layers (which normally contain the leafing pigment) is highly probable and undesirable. As explained below, the leafing or nonleafing character of a pigment is determined by the use of particular materials in producing or subsequently treating its constituent flakes. Nonleafing aluminum flake pigments are generally employed in all applications when metallic luster without bare metallic appearance is desired in a coating.

The production of leafing and nonleafing aluminum flake pigments alike involves reducing particulate aluminum (such as foil scrap or atomized aluminum powder) to the desired minute flake form, conventionally by subjecting the particulate aluminum to the action of a ball mill, stamping mill or other equipment capable of flattening and breaking up the particles, in the presence of a minor proportion (based on the weight of aluminum) of a so-called "milling agent" such as a fatty acid. For convenience of reference, the operation of reducing particulate aluminum to flake form will herein be termed "milling," and the equipment in which it is performed will be termed a "mill," regardless of the specific nature of the operation and equipment used. Milling may be performed either dry (in air or other gas) or wet in a liquid hydrocarbon milling vehicle such as mineral spirits. While dry milling facilitates handling and product size classification because the metal particles can be blown into and out of the mill in dry condition, wet milling is often preferred as a precaution against explosion in view of the pyrophoric characteristics of aluminum powder. After milling, the flake particles may in some instances be subjected to various additional treatments.

Presence of the milling agent in the milling operation is essential to protect the aluminum particles during reduction so that they are flattened into flake form rather than being merely broken up, and to prevent cold welding of the particles. In addition, the milling agent covers the particle surfaces with a layer of material which remains with the particle after milling. This layer of material imparts certain characteristics to the finished flake product and protects the flake particle from corrosion, oxidation or other deleterious attack so as to aid in preserving the brightness or luster of the produced pigment, while reducing the hazard of fire or explosion incident to handling aluminum powder. The material of this layer is herein termed "milling agent residue" because it consists essentially of the milling agent compound or compounds present during milling and/or derivatives thereof produced by reaction in the course of or as a consequence of the milling operation.

It is currently believed that some milling agent residue of the described layer may actually be bonded chemically to the flake. In any event, some of the layer of residue is in very close proximity and/or direct contact with elemental metal at the flake surfaces (whether or not such contact involves chemical bonding). This is necessarily true in that the milling agent is present as the aluminum particle's elemental metal surfaces are exposed by milling.

Leafing aluminum flake pigments are made by using, as the milling agent, one or more substances herein termed "leafing milling agents" which are known to impart leafing properties to the flakes. Leafing is believed substantially attributable to the layer of residue of such milling agent on the produced flakes, and in particular to surface tension effects caused by that layer. Currently, saturated fatty acids such as stearic and/or palmitic acids are very commonly used as leafing milling agents. These acids are highly efficacious milling agents, and enable milling to be performed with high efficiency, efficiency being expressed as proportion of total particulate aluminum charge that is reduced to the desired particle size in a single pass through a mill while being flattened into flake form therein. The desired sizing of leafing flake pigments thus produced is readily controllable by, for example, variation in resident time of the charge of aluminum in the mill. Consequently, the manipulative operations involved in making leafing aluminum flakes are advantageously simple, straightforward and convenient. These manipulative operations (apart from the specific milling agent employed) will be termed "leaf milling" herein; i.e. it will be understood that the term "leaf milling" designates that milling operation (whether in a ball mill or other equipment) which, if performed with known leafing milling agents such as stearic acid, would result in production of a leafing flake pigment.

In contrast, current commercial methods of making nonleafing pigments are attended with serious difficulties and disadvantages. The pigments made in accordance with these methods have demonstrated many undesirable properties including deficiencies in one or more of the following characteristics: tinting strength (hue produced by a given volume of pigment having a specified particle size distribution in a finish), opacity (hiding ability of a given volume of pigment having a specified particle size distribution), metallic luster or brightness, flop (change in hue or lightness, e.g. color intensity, with change in viewing angle), and freedom from agglomeration and graininess.

Neither of the two procedures currently commonly employed for commercial production of non-leafing aluminum flake pigments is comparable to the ease and/or efficiency of leaf milling techniques. In one of these procedures, known as chemical deleafing, particulate aluminum is first leaf milled in the presence of a leafing milling agent (e.g. stearic and/or palmitic acid). The resultant flakes are then treated with deleafing agents such as lead naphthenate or octoate, aqueous phosphates or acetic acid. In another procedure for preparing non-leafing flake pigment, a non-leafing milling agent, such as oleic acid, is used in the milling operation.

Chemically deleafing a leafing flake pigment is disadvantageous from the standpoint of operational convenience, because it requires an additional step after milling. The deleafing agents, which remain in the product, are considered undesirable contaminants or pollutants at least for some applications. In addition, the deleafing step may sometimes tend to agglomerate the flake material.

Use of known nonleafing agents, in particular oleic acid, also presents serious drawbacks, because their effectiveness as milling agents is poor. Consequently, milling times must be short (as compared with leaf milling) to avoid product degradation. Efficiency is very low resulting in milled metal commonly containing high levels of oversized particles. This oversize may constitute as much as 30% of the total feed, necessitating successive remilling and screening to obtain a properly sized pigment. Remilling of the oversized particles is even less efficient. Use of oleic acid also apparently results in lower extent of protective covering of the flakes than is provided by leafing milling agents, and consequently increases the hazard of explosion and reduces the ability to attain very fine particle sizes. Due to this lower protection from the use of oleic acid, the production of so called dry pigments is essentially restricted to very coarse grades. The production of dry pigments, i.e. those containing very low quantities of the liquid milling vehicle, is highly desirable in situations wherein the liquid vehicle is deleterious to the particular pigment application.

Currently commercially available nonleafing aluminum flake pigments, as produced by the above described procedures, have substantial shortcomings. Chemically deleafed pigments, even if not agglomerated, are dull and relatively unattractive, possibly owing to etching of the flake surfaces by the deleafing agent. Pigments made with oleic acid as a milling agent tend to form insoluble agglomerates, especially in the finer grades, upon standing for any length of time, with resultant undesired graininess. Indeed, progressive agglomeration often renders them virtually unuseable after relatively short periods of storage. Known additives for inhibiting such agglomeration have adverse effects in various applications in which the pigments may be used. Moreover, conventional nonleafing milling agents such as oleic acid afford poor particle size control, which detracts from such desired product qualities as consistent tinting strength and opacity.

Alternative production of nonleafing aluminum flake pigments have been set forth in U.S. Pat. Nos. 2,858,230 (treatment of leafing pigment wich an aqueous solution containing available PO4 ion), 3,264,129 (use of certain aliphatic amines as milling agents), and 3,389,105 (use of fluorocarbon resins as milling agents). These proposals, however, have not found commercial acceptance as ways to overcome the problems associated with current nonleafing aluminum flake pigments and their manufacture.

U.S. Pat. No. 3,781,177 teaches that admixture of isostearic acid with previously milled aluminum flake powder (presumably already bearing a layer of milling agent residue) agglomerates and thereby dedusts the powder for explosive use. Such agglomeration is undesirable for pigments.

SUMMARY OF THE INVENTION

It has now been unexpectedly discovered that a bright nonagglomerating, nonleafing aluminum flake pigment characterized by advantageously high opacity, consistent tinting strength, and freedom from undue flop and graininess, can be produced by leaf-milling in the presence of a milling agent comprising isostearic acid, either alone or together with an amount of a nonleafing milling agent effective to reduce residual leafing effects. Broadly stated, the invention contemplates an at least substantially nonleafing aluminum flake pigment comprising aluminum flake particles having a surface layer comprising isostearic acid milling agent residue.

Further, the invention contemplates a method for producing a substantially nonleafing aluminum flake pigment comprising milling particulate aluminum to flake form in the presence of a milling agent comprising isostearic acid in an amount effective to act as a milling agent, i.e. to perform the functions of a milling agent in promoting the reduction of the aluminum particles to flake form. In a preferred embodiment, the milling agent comprises isostearic acid and an amount of at least one nonleafing milling agent, in an amount effective to substantially eliminate residual leafing effects.

The product of this process is a pigment having, on the pigment particles, a layer of the milling agent residue which results from milling particulate aluminum to flake form in the presence of a milling agent comprising isostearic acid.

The produced pigment is bright and nonleafing in character, and imparts a deep metallic luster to finishes incorporating such pigments, e.g. coatings of paints or inks, in contrast to the unsatisfactorily dull previously known nonleafing aluminum flake pigments produced by milling particulate aluminum with a leafing-type milling agent and then deleafing the flake. Additionally, the presscake and final pigment product of the invention (whether dry, or containing a minor amount of wet milling vehicle) have advantageously long shelf life, being free from the tendency to agglomerate which characterizes the previously known nonleafing milling agents such as oleic acid. In those embodiments of the present process which utilize a small amount of oleic acid and/or other nonleafing milling agent in conjunction with the isostearic acid, the other agent further enhances the nonleafing characteristics of the pigment product, without causing agglomeration. The process of the invention is characterized by surprisingly high efficiency, typically greater than 95%, and requires no subsequent deleafing treatment to achieve a fully satisfactory nonleafing pigment.

In a particularly advantageous and, therefore, greatly preferred embodiment, the pigment of the present invention is sized, filtered and/or otherwise treated (after milling) to adjust the content of volatiles, and formed into a presscake, to be provided as a "dry" pigment product, even in very fine size grades. This is possible owing to the unexpectedly superior protection against explosion provided by the isostearic acid milling agent residue in accordance with the inventive concept.

DETAILED DESCRIPTION

Further features and advantages of the invention will be apparent from the detailed description herein set forth.

The starting material for the process of the invention (i.e. the metal to be milled) is particulate aluminum, such as foil scrap, atomized aluminum powder, or other aluminum particles, use of the atomized powder being at present regarded as especially convenient. Preferably, this starting material or virgin aluminum charge is in all respects essentially identical to the virgin aluminum charge conventionally employed in present-day commercial procedures for making leafing aluminum flake pigments by leaf-milling in the presence of a leafing milling agent.

As a particular feature of the invention, the virgin aluminum charge is reduced to flake form by milling in the presence of a milling agent comprising isostearic acid. The term isostearic acid is used herein in the same sense as in the aforementioned U.S. Pat. No. 3,781,177. As there stated, the term "isostearic acid" is not intended to be restricted to its literal translation of 16-methylheptadecanoic acid but rather is intended in its more common meaning as is normally associated with a coined name, in this case for mixtures of $C_{18}$ saturated fatty acids of the general formula $C_{17}H_{35}COOH$. These are rather complex mixtures of isomers, preferably liquid at room temperature and primarily of the methyl-branched series, which are mutually soluble and virtually inseparable. While most of the branched chains contain a total of eighteen carbon atoms, not necessarily all of the molecules contain exactly that number. The branch is primarily methyl but may possibly include some ethyl and the isomeric distribution is typically primarily towards the center of the chain but is fairly random. Methods pertaining to the production of isostearic acid are described in U.S. Pat. Nos. 2,664,429 and 2,812,342. One isostearic acid suitable in the practice of the invention is marketed commercially by Emery Industries, Inc., under the trade names Emery ® 871 and Emery ® 875 Isostearic Acid. Typical characteristics of the Emery ® 871 acid are listed in the following table:

| | |
|---|---|
| Titer, °C. max. | 10 |
| Iodine value, max. | 10 |
| Free fatty acid, % (as oleic) | 88 |
| Acid value | 175 |
| Saponification value, min. | 180 |
| Molecular weight (approx.) | 284 |
| Refractive index, 25° C. | 1.4603 |
| Viscosity, cps., 25° C. | 48 |

In preferred embodiments of the invention, the milling agent further comprises (i.e. together with the isostearic acid) an amount of another nonleafing milling agent effective to reduce any residual leafing characteristics of pigment product produced with isostearic acid milling agent. Suitable substances for use as such other agent are substances heretofore conventionally used as nonleafing milling agents in the production of nonleafing aluminum flake pigments, for example unsaturated fatty acid such as oleic, linoleic, and ricinoleic acid. Oleic acid is at present especially preferred.

The relative proportions of milling agent and virgin aluminum charge used in the practice of the process of the invention are such that the total weight of milling agent (including isostearic acid) present during milling is equal to a minor percentage of the weight of aluminum present during milling, and is an amount effective to act as a milling agent (for that weight of aluminum) in promoting reduction of the particulate aluminum to flakes. It is preferred that the weight of isostearic acid employed be equal to between about 3% and about 7%, more preferably between about 4% and about 5%, of the weight of the virgin aluminum charge, and that the weight of other nonleafing milling agent (if used) be equal to between about 1.5% and about 3%, more preferably between about 2% and about 3%, of the weight of the virgin aluminum charge.

The milling step of the present process is performed in a mill of any type (for example, such as a ball mill or stamping mill) suitable for performance of a conventional leaf-milling operation to reduce particulate aluminum flake form in the presence of a leafing milling agent. Such mills are entirely conventional in structure and operation, and, being well known to those of ordinary skill in the art, need not be further described. This milling step can be performed either as a dry-milling operation (with only the milling agent present), or as a wet-milling operation using any liquid wet-milling vehicle that is essentially inert with respect to the aluminum charge and the milling agent. Suitable liquids for this purpose include conventional wet-milling vehicles such as mineral spirits, i.e. blends of aliphatic hydrocarbons which can contain aromatic hydrocarbons, as well as naphthas, and low boiling and higher boiling petroleum fractions.

In the practice of the process of the invention, the virgin aluminum charge, isostearic acid, other nonleafing milling agent (if used), and wet-milling vehicle (if used) are supplied to a suitable mill as defined above, and the mill is operated for a period of time sufficient to reduce the supplied aluminum of the charge to flake form, with concomitant reduction in particle size of the aluminum to a desired maximum value. All aspects and features of performance of this milling operation can be in conformity with standard or conventional leaf-milling techniques (i.e. as heretofore known and used to produce leafing aluminum flake pigments) except that the milling agent used for the process of the present invention comprises isostearic acid (alone, or together with another nonleafing milling agent as heretofore described) rather than a leafing milling agent. Thus, the selection of the virgin charge, milling apparatus, wet or dry milling condition, duration of milling, final particle size distribution (as well as the ratio of ball charge to virgin aluminum charge, and ball size distribution, when a ball mill is employed) and other conditions are all in accordance with conventional leaf-milling techniques well known to the skilled artisan as exemplified, for instance, by the procedures described in U.S. Pat. No. 3,776,473 and references cited therein. In the present inventive process however the material supplied to the mill includes isostearic acid as the predominant milling agent. That is to say, in the process of the invention a virgin charge of particulate aluminum is subjected to a leaf-milling operation that is entirely conventional except for the isostearic milling agent used.

At the end of the milling time, the milled flake pigment product of the invention is discharged from the mill, as a dry particulate if dry milling has been performed, or, when met milling is employed, in a mixture with the liquid wet-milling vehicle. This product is a pigment having, on the pigment particles, a surface layer of the milling agent residue which results from milling particulate aluminum to flake form in the presence of a milling agent comprising isostearic acid. By way of explanation without limitation, it is believed that the milling agent residue is a limited reaction product, i.e., a product of at least partial chemical reaction of the milling agent in the presence of aluminum under influence of the milling conditions. In any event, the layer comprises isostearic acid which has been modified by subjection to the conditions of milling and is in direct contact with at least some elemental aluminum exposed at the flake surfaces by the milling operation. If an effective amount of another nonleafing milling agent is also present during milling, this layer of course includes the residue of such other agent.

The described product of the invention is a nonleafing aluminum flake pigment, which is significantly brighter than typical nonleafing aluminum flake pigments produced by conventional deleafing techniques, yet which does not exhibit the tendency to agglomerate characteristic of nonleafing aluminum flake pigments produced by milling with a conventional nonleafing milling agent such as oleic acid. Presence of effective amounts of oleic acid or other nonleafing milling agent together with isostearic acid, in preferred embodiments of the process of the invention, overcomes any residual leafing tendency which may be exhibited by aluminum flake pigments produced with isostearic acid alone as the grinding agent. In proportions within the above-stated range, the oleic acid (or other nonleafing agent) does not cause undesired agglomeration of the present product even after storage for many months.

A further particular advantage of the use of isostearic acid as a milling agent is that while providing a bright nonleafing pigment, the residue imparts a higher level of protective coverage to the produced flake particles, and leaves a larger amount of free milling agent present with the pigment, than is attainable by use of an unsaturated fatty acid (e.g. oleic acid) alone as a milling agent. Thus, whereas milling to produce nonleafing aluminum flake pigments with conventional nonleafing milling agents is known to be hazardous, especially when making very fine grades of such product, owing to the high reactivity of the freshly milled flake with oxygen and to the typically low levels of fatty acid protecting the flake, the present invention enables performance of milling at ambient conditions (preferably with some cooling of the mill for added safety) without substantial risk of fires and/or explosions. Moreover, as hereinafter further explained, the high level of protective coverage of the produced flakes afforded by the isostearic acid milling agent residue enables safe provision of the pigment as a dry, powderlike product, which is desired for various applications. The absence of the agglomerating characteristics, present in the prior art nonleafing flake, allow the storage of the instant pigment material without the requirement to add stabilizers. Such stabilizers are found deleterious in certain applications.

A still further advantage of the process of the present invention is that the particle size distribution of the produced pigment exhibits little variation from one batch to another in accordance with those variations normally experienced in the product from leaf milling. Hence greater consistency in product properties is achieved than has heretofore been possible with nonleafing products without extensive reprocessing to obtain proper particle size distributions. Stated more generally, isostearic acid is found to be a far more efficacious milling agent than oleic acid and, like previously known nonleafing milling agents, affords significantly enhanced uniformity of milling (as compared to prior practice) and, very advantageously, enables milling to be continued (without excessive product degradation) for adequately long times to achieve high operating efficiency in terms of proportion of total particle charge reduced below a given upper size limit on a single pass of the charge through a mill.

As in standard leaf-milling procedure, the particle size of the nonleafing pigment product of the present process is controlled, for example, by the length of time of the milling step as is well known to those skilled in the art. The average time (e.g. in a ball-milling operation) is usually from about two to about 24 hours, and most commonly between about two and about seven hours.

As specified in ASTM Standard D962, a fine pigment is one which retains a maximum of 0.1 wt % on a number 325 Tyler mesh sieve (about 45 microns); a medium fine pigment is one wherein a maximum of 1.0 wt % is retained on a number 325 sieve; and a medium pigment is one wherein a maximum of 11 wt % is retained on a number 325 sieve. To make medium pigments in accordance with the present process (using a ball mill for the milling step), a milling time of about three hours is used with standard ball changes, and about five hours for the fine grades. If a still finer product is desired, longer milling times are used.

After milling, the pigment of flake-vehicle mixture is screened to size the product and remove oversized particles. Under previously used milling conditions to manufacture nonleafing pigments, e.g. wherein oleic acid was used as the sole milling agent, as much as 30% by weight would be oversized materials thus necessitating successive screenings to separate the oversized material from the desired particle size fraction. The oversized material must be further processed so as to break it down to the desired size. Such successive screening steps and further processing have heretofore been a manufacturing bottleneck. The high milling efficiency (typically above 95%, in terms of weight percent of aluminum pigment product particles below a given upper size limit after a single pass through the mill) achieved in the practice of the present invention through the use of isostearic acid eliminates these successive remillings and screenings and thus improves the overall efficiency of the process resulting in substantial savings. Thus, upon completion of milling in the presence of the isostearic acid milling agent used in this invention, substantially all of the product can be immediately screened to the proper size with little or no waste.

When the milling step of the present process is performed as a wet-milling operation, so that the produced pigment is delivered from the mill in mixture with the liquid wet-milling vehicle used, the mixture (after screening or sizing as described above) is filtered to remove excess liquid vehicle and thereby to form a paste or so-called presscake of the pigment. If it is desired to store or sell the presscake as a pigment, the metals or nonvolatiles content of the presscake can be adjusted to a conventional value e.g. in a range of about 60 to about 75 (preferably about 65 to about 72) percent by weight, typically by mixing the cake with a suitable conventional liquid carrier vehicle such as mineral spirits.

In some instances, additional saturated fatty acids are added to the presscake, preferably during the adjustment with mineral spirits to form a paste product. The fatty acid acts as an antipyrophoric and dispersing agent. The fatty acid may, for example, be lauric acid or other saturated fatty acid (even an acid that would act as a leafing milling agent if present during leaf milling) which may be added after the milling step, preferably after screening, during the adjustment of the nonvolatiles content. The preferred amount of such agent ranges from about 1½ to about 3 wt % based upon the metal content with the preferable amount being about 2% by weight. It should be noted that if lauric acid is added during milling, it has been found that some leafing results in the flake product, but the post-milling addition of lauric acid does not cause leafing to occur. One of the advantages of the instant flake product is that less fatty acid is required and that additional isostearic acid may be added (as a substitute for the fatty acid) to form a paste product.

In many instances, however, it is preferred to provide a "dry" powderlike pigment product, especially where the pigment is intended for use in a finish (e.g. paint or ink) vehicle in which the liquid carrier such as mineral spirits would have adverse effects. Consequently, in presently preferred wet-milling embodiments of the invention, the filtered presscake is treated to remove the volatiles content (wet-milling vehicle) as by vacuum, with or without heating, for providing the pigment in the desired dry condition. Of course, if the milling step is performed as a dry-milling operation, the pigment as delivered from the mill is already dry, there being no liquid vehicle in the mill.

In either case, provision of a dry product in the practice of the present invention is accomplished without undue hazard owing, as stated above, to the protection afforded by the layer of isostearic acid milling agent residue on the milled flakes. It will be understood that the flakes of the "dry" product retain this coating.

An exemplary specific embodiment of the process of the invention, incorporating preferred features noted above, is performed by feeding, to a ball mill of a type (and containing a charge of balls) heretofore conventionally used to produce leafing aluminum flake pigments, a quantity of atomized aluminum powder, and isostearic acid and oleic acid in proportions (relative to the weight of aluminum) within the preferred ranges specified above, in the presence of mineral spirits (as a liquid wet-milling vehicle), the relative proportions of ball charge, aluminum and mineral spirits in the mill conforming to conventional leaf-milling practice; milling the aluminum by operating the ball mill in conventional manner for a period of time (as specified above) to produce a desired particle size grade of pigment; discharging the produced flakes from the mill, in mixture with mineral spirits; sizing the product by screening; and removing the mineral spirits to obtain a dry powder pigment product.

The pigment product of the invention, whether provided as a dry powder, as a presscake or as a paste, is capable of prolonged storage without agglomeration or other deterioration. Typically, this powder or presscake is used by mixing with a finish (e.g. paint or ink) vehicle comprising a filmforming binder and a solvent or thinner, which is applied (i.e. with the pigment dispersed therein) to a surface to be coated. In performance tests on pigment products of the invention, it has been found that the use of fine pigments (made according to this invention) in standard commercial finish formulations results in a bright, silvery appearance of such opacity that the amount of pigment can be substantially reduced (as compared with prior nonleafing aluminum flake pigments) to achieve a given desired visual effect, affording significant savings. The hiding and tinting characteristics of the nonleafing aluminum pigments made according to this invention are equivalent to, or better than, those of present-day commercially available materials.

By way of further illustration of the invention, reference may be made to the following specific examples:

In the following examples, various methods were used to identify and evaluate specific characteristics of the product of the instant invention.

Leafing Characteristics

One or more of the following tests were performed to determine leafing characteristics.

ASTM D480—In accordance with this test the indicated flake pigment sample is subjected to procedures incorporated in ASTM designation D480-70 as reapproved in 1976 to determine the leafing characteristics. The results are given in % of leafing.

Mineral Spirits—In accordance with this test a sample portion of the flake pigment is placed in an appropriate vessel and mineral spirit solvent is added with stirring. Leafing is indicated by observing the presence of a shiny (silvery) film on the surface of the mixture. (Usually used with ASTM D480).

Xylene—In accordance with this test a sample portion of the flake is placed in an appropriate vessel and xylene solvent added with stirring. Leafing is indicated by observing the presence of a shiny (silvery) film on the surface of the mixture. (Usually used with ASTM D480).

Gray Enamel Sprayout

In this test, sample panels are prepared in accordance with the following procedure. A coating composition is prepared by mixing the indicated pigment (in paste form) with toluene and a specified amine accelerator. A 4" by 6" mil steel panel electrolytically plated with tin (conforming to Federal Test Standard 141, Method 2012) is rubbed with a grit cloth until the full surface has been sanded. Using a lint-free towel, the sanded surface is cleaned with a solvent (e.g. toluene or lacquer thinner.

The coating composition is applied to the prepared panel using a standard spray gun, such as the Type MBC spray gun manufactured by The deVilbiss Company, set at 50 lb. gun pressure (one full turn on the fluid screw). With the gun held perpendicular to the surface appproximately 8 to 12 inches from the surface, three alternate, overlapping right and left passes are sprayed. The panel is then inverted and sprayed three more overlapping passes. Each pass is started off the panel and the trigger of the spray gun pulled when the gun is opposite the edge of the panel. The trigger is released at the other edge of the panel but the stroking motion is continued for a few inches to assure a smooth, full, wet coating without sags. Then panels are then dried, either in air or in a low temperature oven.

The sample panels are then tested for gloss and total reflectance as follows in accordance with standard practices.

Gloss—In taking gloss readings, a meter with a 60° gloss head is standardized using highly polished black glass such as onyx or carraren. Gloss values are determined accordingly.

Total Reflectance—Total reflectance is determined by use of a reflectometer comprised of an integrating sphere coated with a reflecting medium such as MgO in $CACO_3$, a photo detector and a meter. A light source is directed upon the wall of the coated sphere and the meter is adjusted to 100% (a perfect mirror would theoretically reflect 100% of light directed on its surface). In the test situation, the panel to be tested is substituted for the coated sphere and the percent reflectance gauged by the meter.

Thin Coat Gray Enamel Sprayout

In this test sample panels are prepared using the apparatus and procedures described in the Gray Enamel Sprayout test. The coating admixture used in the Gray Enamel Sprayout is thinned with toluene (two parts by weight of coating to one part by weight of toluene) and applied to the prepared panel with the spray gun set at 50 lb. gun pressure (⅛ turn on the fluid screw). The same spraying technique as described in the Gray Enamel Sprayout test is used except that only three alternate, overlapping left and right passes are made. The panels are then dried and observed by naked eye for seediness and/or graininess and agglomerated appearance of the coating.

Nitrocellulose Lacquer Drawdown

In this test a mixture comprised of a metal flake pigment sample, a thinner (e.g. T28 sold by Sterling Lacquer Mfg. Co.) and a nitrocellulose lacquer base (e.g. Sterling Lacquer No. 1088 sold by Sterling Lacquer Mfg. Co.) is poured onto white, 70# litho paper in sufficient quantity to form a one inch in diameter portion of mixture. The paper is then drawn between a base plate and a spreading bar to distribute the mixture on the paper. The paper containing the distributed mixture is then placed in a 65° C. over for one minute to expedite drying. The dried sample is then tested for gloss and total reflectance using the standard procedures described in the Gray Enamel Sprayout test.

EXAMPLE I

A laboratory size ball mill, three feet in diameter and one foot in length, containing 600 pounds of milling balls was charged with the following:

| | |
|---|---|
| atomized aluminum powder (lbs) | 9.5 |
| isostearic acid* (g) | 195 |
| mineral spirits** (gal) | 2.4 |

*Emery® 875 sold by Emery Industries, Inc., Cincinnati, OH
**Amsco® Mineral Spirits 75 sold by Union Oil Co. of California The mill was activated and run for three hours at 44 rpm. The resultant product was screened through a 325-mesh Tyler screen to produce an extra fine grade pigment. A presscake weighed about eleven pounds (at 71.52% nonvolatiles level) representing a yield of 83.6%. A one pound sample of the presscake material was adjusted with mineral spirits to about 65% nonvolatiles to establish as commercially standard formulation for testing.

The resultant product showed the following characteristics after being subjected to the indicated test:

Leafing Characteristic

ASTM 480: 18%

Nitrocellulose Lacquer Drawdowns

Gloss: 60° = 30
Total Reflectance: 60

Gray Enamel Sprayouts

Gloss: 60° = 38
Total Reflectance = 100

Thin Coat Gray Enamel Sprayout

The dried finish had a nonagglomerated, nongrainy appearance.

EXAMPLE II

This example shows the use of an amount of a second nonleafing milling agent (oleic acid) effective in reducing residual leafing in accordance with the invention. Using the equipment operated under the conditions of Example I, the ball mill was charged with the following:

| | |
|---|---|
| atomized aluminum powder (lbs.) | 9.5 |
| isostearic acid* (g) | 195 |
| oleic acid** (g) | 129 |
| mineral spirits*** (gal.) | 2.4 |

*Emery® 371 sold by Emery Industries, Inc., Cincinnati, OH
**Neofat® 9404 sold by Armak Industrial Chemicals Div., Chicago, Illinois
***Amsco® Mineral Spirits 75 sold by Union Oil Co. of California The amount of presscake obtained was 11 pounds, representing a yield of 84.75% (at 75.18% nonvolatiles level). A one pound sample of the presscake material was adjusted with mineral spirits to about 65% nonvolatiles to establish a commercially standard formulation for testing. The mineral spirit solvent contained 3% stabilizer (Santicizer ® 148 sold by Monsanto) based on the metal content.

The one pound sample thus adjusted was screened through a 325 mesh Tyler sieve. At a non-volatile content of 64.72% only 0.03% by weight of the original sample remained on top of the sieve. No rescreening was deemed necessary. The resultant product showed the following characteristics after being subjected to the indicated test:

Leafing Characteristics

| | |
|---|---|
| ASTM D480 | not deemed necessary |
| mineral spirits | none |
| xylene | trace |

Nitrocellulose Lacquer Drawdowns

Gloss, 60° = 30
Total reflectance = 60

Gray Enamel Sprayouts

Gloss, 60° = 38
Total reflectance = 102

Thin Coat Gray Enamel Sprayout

The dried finish had a nonagglomerated, nongrainy appearance. The remainder of the eleven pound presscake (without stabilizer) was stored in a loosely sealed pail for eight months. Upon examination it was found substantially agglomeration free. This is in contrast with prior art nonleafing pigment milled in the presence of oleic acid milling agent which is found to agglomerate, in the absence of stabilizer, in about twenty-four hours.

Examples I and II show a superior, substantially nonleafing flake pigment product produced in accordance with the invention.

EXAMPLE III

In this example commercial grade extra fine, medium fine and medium nonleafing pastes were prepared utilizing standard leaf-milling methods but with the use of an isostearic acid milling agent.

Two identical mill runs were used to produce extra fine nonleafing paste. To a commercial ball mill containing 30,000 pound ball charge of standard mix, having an average diameter of about 5/16 inch, for leaf-milling atomized aluminum powder was added:

| | |
|---|---|
| atomized aluminum powder (lb.) | 950 |
| isostearic acid* (lb.) | 42 |
| oleic acid** (lb.) | 27 |
| mineral spirits*** (gal.) | 126 |

*Emery® 871 sold by Emery Industries, Inc., Cincinnati, OH
**Neofat® 9404 sold by Armak Industrial Chemicals Division, Chicago, Illinois
***Amsco® Mineral Spirits 75 sold by Union Oil Company of California The mill was activated and operated for 6½ hours and 31 rpm for each run. In each case the resultant product was screened through a 250-mesh Tyler sieve with virtually no perceivable oversized product.

After filtering, the presscake from the two runs was combined and adjusted to about 65% nonvolatile with mineral apirits. Two percent lauric acid by weight based on the metal content, was added to prepare a pigment in paste form to enhance dispersibility of the flake in an appropriate vehicle. The nonvolatile content was 68.55% with only 0.05%, by weight, being retained on a 325-Tyler mesh sieve. The resultant product showed the following characteristics after being subjected to the indicated test:

| | |
|---|---|
| ASTM D480 | 0% |
| mineral spirits | none |
| Xylene | trace |

Nitrocellulose Lacquer Drawdowns

Gloss, 60° = 28
Total reflectance = 58

Gray Enamel Sprayout

Gloss, 60° = 32
Total reflectance = 104

Thin Coat Gray Enamel Sprayout

The dried finish had a nonagglomerated, non-grainy appearance.

Two additional mill runs were made using the same equipment operated under the same conditions to demonstrate the effect of milling time, using the following formulations and parameters:

| | Medium | Medium Fine |
|---|---|---|
| atomized aluminum (lb) | 900 | 1100 |
| isostearic acid* (lb) | 36 | 44 |
| oleic acid** (lb) | 27 | 33 |
| mineral spirits*** | 137 | 142 |
| ball charge (lb; 5/16 average) | 30,000 | 30,000 |
| time (hr) | 3 | 5 |
| rpm | 31 | 31 |
| screen, mesh (tyler) | 160 | 250 |

*Emery® 871 sold by Emery Industries, Inc., Cincinnati, OH
**Neofat® 9404 sold by Armak Industrial Chemicals Division, Chicago, Illinois
***Amsco® Mineral Spirits 75 sold by Union Oil Company of California In each run the entire product passed the indicated screen and was filtered to recover a press-cake which was adjusted to about 65% nonvolatiles with mineral spirits. Two percent lauric acid by weight (based on the metal content) was added to enhance dispersability of the flake. The resultant products showed the following characteristics after being subjected to the indicated tests:

| Medium | | Medium Fine | |
|---|---|---|---|
| % Retained on 325 Tyler Mesh Screen | | | |
| 0.96% | | 0.31% | |
| Leafing Characteristics | | | |
| ASTM D480 | 0% | ASTM D480 | 0% |
| mineral spirits | none | mineral spirits | none |
| xylene | trace | xylene | trace |
| Nitrocellulose Lacquer Drawdown | | | |
| Gloss, 60° = 30 | | Gloss, 60° = 44 | |
| Total reflectance = 61 | | Total reflectance = 60 | |
| Thin Coat Gray Enamel Sprayout | | | |
| good appearance; slight graininess due to coarseness of pigment; no agglomeration | | good appearance no graininess; no agglomeration | |

This example shows that, in accordance with accepted "leaf milling" techniques, use of isostearic acid milling agent yields comparable nonleafing products, each of which exhibits good tinting strength, hiding and dispersability characteristics.

EXAMPLE IV

In this example, three grades of "dry" non-leafing aluminum flake pigments were produced in accordance with the invention using a commercial ball mill: Formulation A—extra fine, Formulation B—medium fine and Formulation C—medium. The formulations in Table I resulted in the yields and characteristics in Table II.

TABLE I

| | Extra-Fine Formulation A | Med. Fine Formulation B | Medium Formulation C |
|---|---|---|---|
| atomized aluminum powder (lbs.) | 90.0 | 120.0 | 130.0 |
| isostearic acid* (lbs.) | 4.5 | 4.5 | 5.0 |
| oleic acid** (lbs.) | 2.5 | 2.25 | 2.5 |
| mineral spirits*** (gals.) | 15 | 16 | 18 |
| ball charge (lbs.) 5/16" diam. ave. | 6000 | 6000 | 6000 |
| milling time (hrs.) | 4 | 3 | 2-¾ |
| rpm | 46 | 46 | 46 |

TABLE I-continued

|  | Extra-Fine Formulation A | Med. Fine Formulation B | Medium Formulation C |
|---|---|---|---|
| screen, mesh (Tyler) | 250 | 250 | 160 |

*Emery ® 871 sold by Emery Industries, Inc., Cincinnati, OH
**Neofat ® 9404 sold by Armak Industrial Chemicals Division, Chicago, Illinois
***Amsco ® Mineral Spirits 75 sold by Union Oil Company of California

TABLE II

|  | Formulation A | Formulation B | Formulation C |
|---|---|---|---|
| yield | 100% | 100% | 100% |
| non-volatile (%) | 73.2 | 75.8 | 76.0 |
| leaf (%) (ASTM D480) | 0 | 0 | 0 |
| +325 mesh at 65% | .12 | .43 | 1.68 |

Formulations B and C were then dried to produce a dry flake product. The dry flake from presscakes of Formulations B and C as well as the "dedusted" dry flake from Formulation B were combined with the constituents shown in Table III. The resultant mixtures were then placed in a Stokes steam jacketed vacuum drier for the length of time indicated. After drying, the mixtures were screened and tested, the results of such tests being indicated in Table IV.

TABLE III

|  | Formulation B (dry flake) | Formulation B (dedusted) | Formulation C |
|---|---|---|---|
| Formulation B (lb.) (75.8% nonvolatiles) | 500 | — | — |
| Formulation B - dedusted (lb.) (75.8% nonvolatiles) | — | 500 | — |
| DuPont Teflon® K (g) (dedusting agent) | — | 229 | — |
| Formulation C (lb.) (76.0% nonvolatiles) | — | — | 600 |
| isostearic acid (lb.) | 7.5 | 7.5 | 9 |
| aluminum pellets (lb.) | 1000 | 1000 | 1000 |
| drying time (hr.) | 4.5 | 4.5 | 3.5 |
| screen, mesh (Tyler) | 100 | 10 | 80 |

TABLE IV

|  | Formulation B (dry flake) | Formulation B (dedusted) | Formulation C |
|---|---|---|---|
| leaf, % (ASTM D480) | 0 | * | 0 |
| +325 mesh, % at 99.5% nonvolatile | 0.45 | * | 1.24 |

*webbing of Teflon® flake particles precludes any meaningful evaluation of physical properties This example shows that fine grade aluminum flake pigments can be prepared effectively in accordance with the invention.

EXAMPLE V

In this example two commercially available aluminum flake pigment materials of equivalent grade were mixed with isostearic acid in various percentages to determine the effect on flake which has been milled in accordance with conventional techniques and milling agents.

First a nonleafing aluminum flake was admixed with isostearic acid. To seven 250 g samples of commercially available nonleafing aluminum flake material milled with oleic acid (MD 3100 sold by Alcan Aluminum Corporation, Cleveland, Ohio 44101) was added isostearic acid in weight percentages as shown in Table V. Each sample was thoroughly admixed on a laboratory roller in a metal container for fifteen minutes. A portion of each sample was then subjected to the ASTM D480 leafing test as well as screening through a 325 mesh (Tyler) seive with the following results:

TABLE V

| Sample # | % of Isostearic Acid | Leaf % | Material +325 Sieve |
|---|---|---|---|
| 1 | 0 | 0 | 9.76 |
| 2 | 0.1 | 0 | 8.50 |
| 3 | 1 | 0 | 5.56 |
| 4 | 2 | 0 | 6.06 |
| 5 | 3 | 0 | 7.34 |
| 6 | 4 | 0 | 7.55 |
| 7 | 5 | 0 | 6.46 |

The addition of the isostearic acid did not appear to affect the leafing (nonleafing) characteristics of the flake material. The addition of the isostearic acid may have slightly increased the dispersibility of the pigment material as indicated by the decrease in the amount of flake remaining on the 325 mesh sieve.

A leafing aluminum flake was then admixed with isostearic acid. To seven 250 g. samples of commercially available leafing aluminum flake material milled with stearic acid (MD 7100 sold by Alcan Aluminum Corporation, Cleveland, Ohio 44101) was added isostearic acid in weight percentages as shown in Table VI. The same equipment was used and techniques and tests performed as in the case of the nonleafing flake with the following results:

TABLE VI

| Sample # | % of Isostearic Acid | Leaf % | Material on +325 Sieve |
|---|---|---|---|
| 1 | 0 | 33 | 6.93 |
| 2 | 0.1 | 27 | 6.89 |
| 3 | 1 | 32 | 5.18 |
| 4 | 2 | 35 | 3.96 |
| 5 | 3 | 28 | 3.66 |
| 6 | 4 | 24 | 1.93 |
| 7 | 5 | 28 | 3.25 |

As can be seen from the table, addition of isostearic acid had little effect on the leafing characteristics of the sample flake. The dispersibility again was slightly enhanced as evidenced by the decreasing amount of material remaining on the 325 mesh sieve.

This example shows that the subsequent addition of isostearic acid after milling has substantially no effect on leafing (or nonleafing) characteristics of conventionally milled flake, i.e. not milled in the presence of an isostearic acid milling agent.

EXAMPLE VI

In this example isostearic acid was added to a commercially available nonleafing pigment milled in the presence of oleic acid to show the effect of post addition of isostearic on agglomerative characteristics.

The extra fine pigment produced in accordance with the invention in Example IV (Formulation A) was compared with a commercially available pigment of equivalent grade. The commercial material (Formulation D) was a nonleafing aluminum flake, produced with oleic acid milling agent (MDE 796 sold by Alcan Aluminum Corporation, Cleveland, Ohio 44101). Samples of both formulations were first "washed with petroleum ether, then dried on a vacuum pump to remove any free fatty acids or additives. Isostearic acid was then added to the dry powder in the amount indicated as Table VII. Each sample was thoroughly admixed on a laboratory roller in a metal container for 15 minutes. The samples were checked initially, after 24 hours and after 72 hours for agglomeration and seediness. The results are indicated in Table VII.

TABLE VII

| Formulation | Agglomeration and Seediness | | |
|---|---|---|---|
| % isostearic acid | Initial | 24 hours | 72 hours |
| A (0%) | none | trace | trace |
| D (0%) | none | trace | moderate |
| D (0.1%) | none | trace | slight |
| D (1%) | none | trace | severe |
| D (2%) | none | none | severe |
| D (3%) | none | none | severe |
| D (4%) | none | trace | severe |
| D (5%) | none | trace | severe |

As can be seen from the table, subsequent addition of isostearic acid to a commercially prepared nonleafing material appears to accelerate the agglomeration.

EXAMPLE VII

In this example the pigments of Example IV were compared with commercially available pigments of equivalent grade and opacity. In all cases the Gray Enamel Sprayout procedure was used to produce test panels.

Formulation A was compared with Alcoa 2290 (sold by Aluminum Company of America, Pittsburgh, Pa), Reynolds LSB-36 (sold by Reynolds Metals Co., Richmond, Va.) and Silberline 7000AR (sold by Silberline Manufacturing Co., Inc., Lansford, Pa.). All four pigments are classified by ASTM D-962 as Type 4, Class A (0.1% maximum +325 mesh).

Formulation B was compared with Alcoa 221 (sold by Aluminum Company of America, Pittsburgh, Pa.) and Reynolds 30LN (sold by Reynolds Metal Company, Richmond, Va.). All three pigments are classified by ASTM D-962 as Type 4, Class B (1.0% maximum +325 mesh).

Formulation C was compared with Silberline Stamford 0 (sold by Silberline Manufacturing Company, Inc., Lansford, Pa.). While Formulation C (1.0% maximum +325 mesh) is considered to be the coarsest of the three pigments prepared in Example IV, it nevertheless is borderline as to classification by ASTM D-962 standards, Class B having a 1.0% maximum +325 mesh and Class C ranging from 1.0% to 11.0%. In this example, Formulation C was compared with a Class B pigmented coating of equivalent hiding.

The panels were then inspected and compared for brightness. The finish on the panels coated with the pigmented material of the instant invention were definitely brighter than the remainder of the panels prepared with the prior art samples.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. In a process for producing a substantially nonleafing aluminum flake by milling particulate aluminum to flake form in the presence of a milling agent, the improvement which comprises using a milling agent comprising isostearic acid.

2. A process according to claim 1 wherein said milling is performed in accordance with leaf-milling techniques.

3. A process according to claim 1, wherein the weight of isostearic acid present during milling is equal to between about 3% and about 7% of the weight of the aluminum present.

4. A process according to claim 1, wherein the milling agent further comprises an amount of another nonleafing milling agent effective to substantially eliminate residual leafing.

5. A process according to claim 4, wherein the weight of isostearic acid present during milling is equal to between about 3% and about 7% of the weight of aluminum present, and wherein the other nonleafing milling agent is an unsaturated fatty acid present during milling in a weight equal to between about 1.5% and about 3% of the weight of aluminum present.

6. A process according to claim 5, wherein the unsaturated fatty acid is oleic acid.

7. A process according to claim 2, wherein the leaf milling is performed in the presence of a liquid wet-milling vehicle.

8. A process according to claim 7, further including the step of removing the wet-milling vehicle from the flake pigment after leaf milling, to provide a dry powder pigment.

9. A process for producing a substantially nonleafing aluminum flake pigment from particulate aluminum comprising:
   milling the particulate aluminum to flake form in a ball mill in the presence of an amount of isostearic acid effective to act as a milling agent and an amount of an unsaturated fatty acid effective to substantially eliminate residual leafing and a liquid wet-milling vehicle for a time sufficient to provide aluminum flake pigment of desired particle size.

10. The process of claim 9 further comprising screening the aluminum flake pigment to recover a product of the desired particle size; and,
    removing the vehicle from the screened product to provide a dry powder pigment.

11. A process for producing a nonleafing aluminum pigment from particulate aluminum, comprising:
    wet-milling the particulate aluminum to flake form in the presence of a milling agent comprising about 3% to about 7% by weight of isostearic acid and about 1.5 to about 3% by weight of oleic acid, each based upon the aluminum content, and a liquid wet-milling vehicle to provide aluminum flake pigment;
    screening the flake pigment to recover a product of desired particle size;
    filtering the product to form a presscake; and
    adjusting the aluminum content of the presscake by adding mineral spirits until the aluminum content is within the range of about 60% to about 75% by weight of the presscake.

12. A substantially nonleafing aluminum flake pigment comprising aluminum flake particles having a surface layer comprising an isostearic acid milling agent residue.

13. The pigment of claim 12, wherein said milling agent residue further comprises at least one other nonleafing milling agent residue in an amount effective to substantially eliminate residual leafing effects.

14. The pigment of claim 13, wherein said other milling agent residue is an oleic acid milling agent residue.

15. The pigment of claim 12, in the form of a dry powder.

16. The pigment of claim 12, in the form of a presscake containing a carrier liquid vehicle.

17. The pigment of claim 14, wherein said oleic acid milling agent residue is formed in the presence of a weight of oleic acid during milling which is not more than about 3% of the weight of aluminum present.

18. The pigment of claim 14 wherein said milling agent residue is formed in the presence of oleic acid and isostearic acid during milling in amounts respectively between about 1.5% and about 3% and between about 3% and about 7% of the weight of aluminum present.

19. A dry pigment powder produced by the process of claim 10.

20. A presscake produced by the process of claim 11.

* * * * *